Dec. 13, 1932.   J. W. WARREN   1,890,798
ARTIFICIAL STONE
Filed Feb. 5, 1931

Inventor
John Wright Warren
By Dyre + Kirchner
Attorneys

Patented Dec. 13, 1932

1,890,798

UNITED STATES PATENT OFFICE

JOHN WRIGHT WARREN, OF KNOXVILLE, TENNESSEE

ARTIFICIAL STONE

Application filed February 5, 1931. Serial No. 513,691.

My invention relates to the manufacture of artificial stone, and more particularly to the production of a fabricated building or architectural stone having superior texture, appearance and acoustical properties.

It is an important object of the method which forms the subject matter of the present application for Letters Patent to produce a fabricated stone characterized by the occurrence of voids in the surface of the stone and, if desired, throughout the interior of the mass as well. These voids or cavities, when produced by my present method, impart a highly ornamental appearance to the completed stone, which may, by a skillful use of pigments, aggregates and voids, be made closely to simulate certain of the natural travertine marbles, dolomite limestones, and other cellular, void-containing natural stones.

Furthermore, according to a preferred manner of practicing my present invention the walls of the voids may be caused to become surfaced with an inorganic salt deposit to produce in the voids substantially any desired contrasting color effects.

An advantage of the present method resides in the formation of the voids automatically by the physical and chemical reactions which take place during the setting of the cast mix, obviating the necessity of any subsequent surface or other treatment, such as etching, leaching, cutting or the like.

A further feature of the invention is the availability of the method to produce voids of any desired size or assortment of sizes, at any depth in the body of the finished stone. Besides affording the advantage of lightness, this characteristic of my method adapts the cast stone to be cut through any portion of its mass without sacrificing the voided or pocketed surface, which may be caused to appear regularly and faithfully through all planes in the interior of the mass.

Another object of the invention is to produce an artificial stone which is possessed of superior acoustical properties, on account of the presence, in any portion of surface area which may be provided in the stone, of a plurality of surface voids, which increase the sound absorptive properties of the stone to a maximum and reduce its sound reflective properties to a minimum.

Other objects, advantages and features of the method and of the product thereof will sufficiently appear from the detailed description hereinafter.

Figure 1:
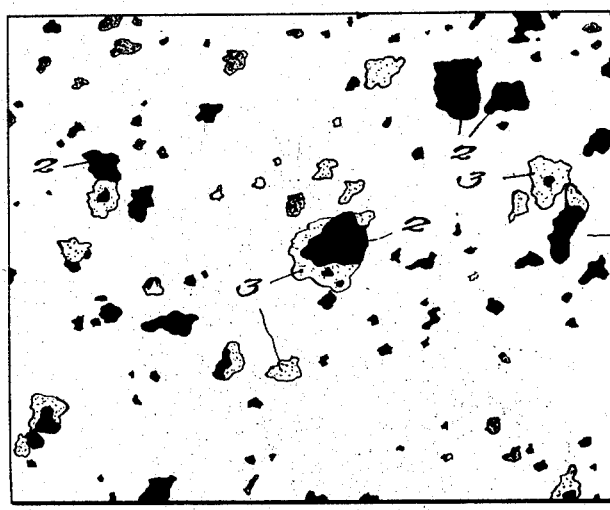
Figure 2:
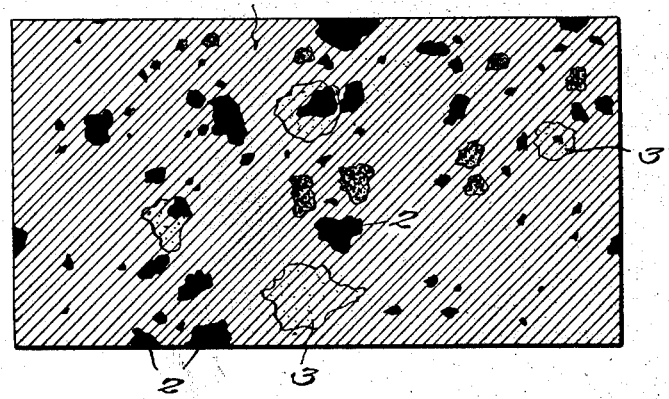

In the accompanying drawing, which illustrates a typical block of stone produced by my novel method, and which forms part of this application for Letters Patent, and wherein the same reference numeral designates the same part in the several views, Figure 1 is a plan view of a characteristic surface of a block of stone produced according to the method; and Fig. 2 is a cross sectional view of the block shown in Fig. 1.

Briefly stated, the novel method which forms the subject matter of this application for Letters Patent contemplates compounding several ingredient materials into a plastic mass or mix which is adapted, when permitted to set, to provide an artificial stone, and introducing into the mass while still plastic a plurality of lumps or aggregates which are soluble in a liquid constituent of the mix. The soluble aggregates are dissolved into the liquid constituent during setting of the mix, and the solution is diffused throughout the mass, leaving in place of the soluble aggregates the characteristic voids which it is an object of the method to produce.

The first step in the method consists in associating together any suitable ingredients for forming an artificial stone. These ingredients may include any well known cementitious material, such, for example, as Portland cement, and the customary sand, gravel, crushed stone or equivalent insoluble aggregates. The several materials are stirred into an intimate mixture in any proper proportions, as is well understood in the art, and sufficient liquid, preferably water, is added to render the mixture plastic and capable of setting. Any suitable pigment may be added to the mix to produce any desired color.

The void-forming ingredients may be any materials which may be obtained in the form of solid lumps or crystals of appropriate size and which are soluble in the liquid constituent of the mix. In a preferred embodiment of the invention I employ crystals of copperas (iron sulphate, having the formula $FeSO_4.7H_2O$) or blue copperas (copper sulphate having the formula $CuSO_4.5H_2O$), both of which materials are soluble in water. I have found that both sulphates function equally well in practice of the process, the choice of the specific sulphate being dependent upon the appearance desired in the completed stone. I regard the use of either sulphate as within the scope of the invention pointed out in the appended claims.

The soluble aggregates, which may be graded according to size to determine the size of the voids to be formed in the stone, as will be understood, are added to the plastic mix in a quantity sufficient to produce voids in the degree of concentration desired. The soluble aggregates are preferably introduced into the mix immediately before the mix is cast and allowed to set, and are preferably uniformly disposed throughout the whole mass of the mix.

It will be appreciated that the function of each individual soluble aggregate is to occupy a space in the mix while the mix is plastic, and subsequently, while the mix is setting, to go into solution into the water or other liquid constituent of the mix, thereby leaving in the hardened stone a cavity or void having the volume and contour of the original solid aggregate. I have found that certain of the soluble aggregates which on account of their cheapness, color producing effect and for other reasons are highly useful in the production of stone according to my present method are so readily soluble as to pass into solution before the quantity of free liquid in the mix has been reduced sufficiently by the process of setting to render the mass sufficiently self-sustaining. This results in collapse or distortion of the voids.

I have found that this premature dissolution of the soluble aggregates can be prevented by coating the aggregates with a film of material which is relatively insoluble in the water or other solvent liquid constituent of the plastic mix. An excellent coating material is a solution of shellac in alcohol. I have found also that solution of other gums or resins in ether, turpentine or the like, or of cellulose in amyl acetate, acetone and the like, may be used. The degree of concentration of the coating solution may be regulated to determine the retardation of the dissolution of the soluble aggregates in the liquid constituent of the mix. The coating solution is applied to the soluble aggregates and allowed to dry more or less thereon, whereupon the coated aggregates are introduced into the mix and the mix cast into molds or otherwise formed into the shape in which the hardened stone is desired.

When the stone has become set and removed from the mold or form, if such be used, it is found that the surface and the interior of the fabricated stone are characterized by a multiplicity of hollow cavities or voids which conform individually in size and form to the size and form of the individual soluble aggregates which have been introduced into the mix, and which occur in a number equal to the number of individual aggregates which have been used. I believe that the physical and chemical phenomena which take place are substantially as follows:

Let it be supposed that the ingredients of a given mix are Portland cement, sand, gravel, a pigment which takes no part in the reactions, and water. When these materials have been intimately united in a plastic mass in proportions proper to form, after setting, a hard and durable artificial stone, there is added a quantity of copperas crystals which have been coated with shellac. The plastic mass is then cast and allowed to set, whereupon the complex reactions involved in the setting of Portland cement begin to take place. The relatively insoluble shellac coating is slowly attacked by the water and begins to break down and expose the copperas to the action of the water by the time the mix has set sufficiently to be self supporting. The copperas is dissolved in the free water and probably oxidized to ferric sulphate, the solution of greatest concentration being present close to the surface of the dissolving solid copperas. By diffusion, the solution in the mix at increasing distances from the solid crystal becomes progressively more concentrated at the expense of the crystal until the crystal has become completely displaced by a solution of ferric sulphate, which in turn is absorbed into the body of the mass and finally either evaporated at the surface or taken up in the formation of the various calcium silicates produced during setting.

A portion of the ferric sulphate is deposited on the walls of the voids, imparting to those walls a handsome brown or yellow color which makes copperas peculiarly useful as a soluble aggregate material in the practice of my method.

The action with blue copperas appears to be similar, excepting that the salt, being already the cupric sulphate, does not appear to become further oxidized but is deposited on the walls of the voids as cupric sulphate, giving to the stone a rich green color.

The accompanying drawing illustrates a typical block of stone produced according to the method which has just been explained. In the drawing the reference numeral 1 designates a surface of the cast stone which may be dressed and polished to a high degree of smoothness by any convenient means or method. The surface 1 of the completed stone contains a quantity of pockets or voids 2 of irregular size, depth and contour, each void, in the preferred embodiment of the invention, being surfaced with a layer of colored material 3, as has been described.

Fig. 2 shows a cross section of the block shown in Fig. 1, and illustrates the occurrence of the voids 2 throughout the interior of the block so that any surface on which the block may be cut will exhibit the voids and present an appearance similar to the cast surface 1. As has been indicated hereinabove, this characteristic of the stone produced by my present method is important and valuable particularly inasmuch as it adapts the stone to be cut, carved and fabricated, as into smaller sized blocks, ornamental capitals and the like.

While I have described the invention as including the step of casting the plastic mass, it is to be understood that the invention is not limited to methods involving the precasting of artificial stone in molds. On the contrary, the invention contemplates methods of making artificial stone which include the step of forming the plastic mass in situ, as in the plastering of walls and ceilings where the material is troweled or otherwise applied to a lath or equivalent base and designed to remain, after setting, in the form and place in which it has been applied.

It is to be understood that I have shown and described my present invention in certain preferred forms of embodiment only, merely for the purpose of illustration. The invention is capable of embodiment in other and further modified forms, but all such embodiments, to the extent that they exhibit the principles of the invention as pointed out in the appended claims, are to be deemed within the scope and purview thereof.

Having thus described my invention, what I claim and desire to secure by Letters Patent is:

1. The method of making void-containing artificial stone which comprises mixing a cementitious material, insoluble aggregates and water to form an intimate plastic mix, adding to the mix lumps of a material selected from the group consisting of iron sulphate and copper sulphate, and then allowing the mix to set.

2. The method of making void-containing artificial stone which comprises intimately mixing a cementitious material and insoluble aggregates, adding water to render the mix plastic, adding to the mix while still plastic a plurality of lumps of material selected from the group consisting of iron sulphate and copper sulphate, and then allowing the mix to set.

3. The method of making void-containing artificial stone as claimed in claim 1, in which the lumps are of copper sulphate.

4. The method of making a void-containing artificial stone as claimed in claim 1, in which the lumps are of ferrous sulphate.

In testimony whereof I affix my signature.

JOHN WRIGHT WARREN.